(No Model.) 3 Sheets—Sheet 1.
H. FLACHSBART.
WAGON OR CAR.
No. 538,248. Patented Apr. 30, 1895.
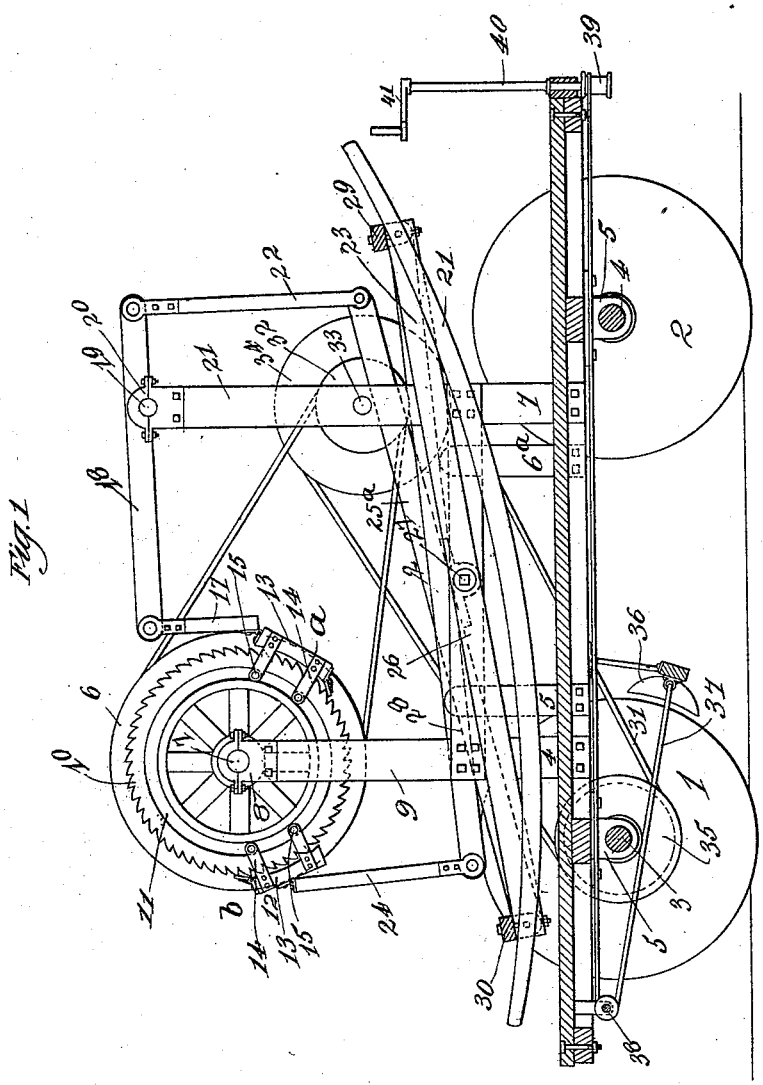

(No Model.)   3 Sheets—Sheet 2.
H. FLACHSBART.
WAGON OR CAR.
No. 538,248.                            Patented Apr. 30, 1895.
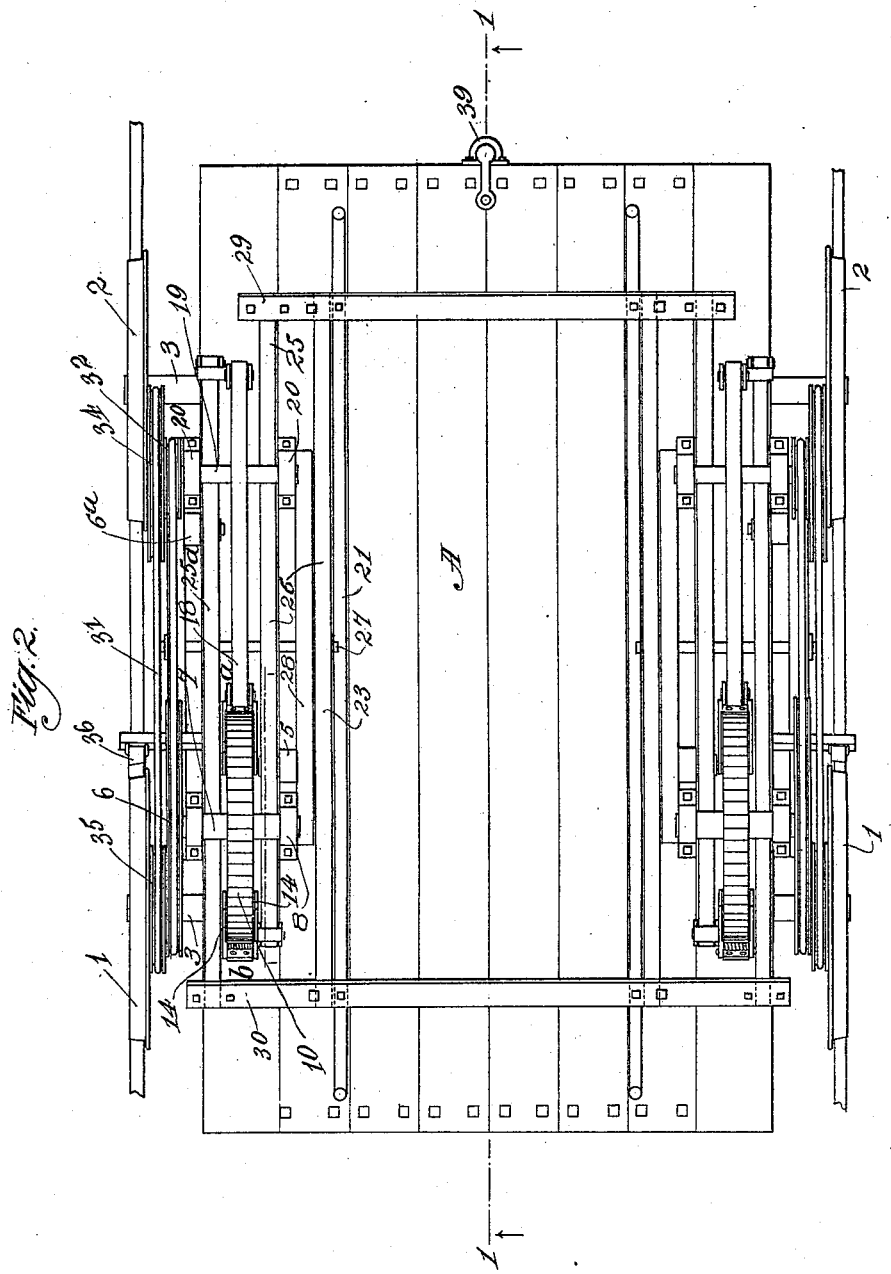
Witnesses:                              Inventor
                                        Hermann Flachsbart
                                        By Kennedy
                                        Attorneys

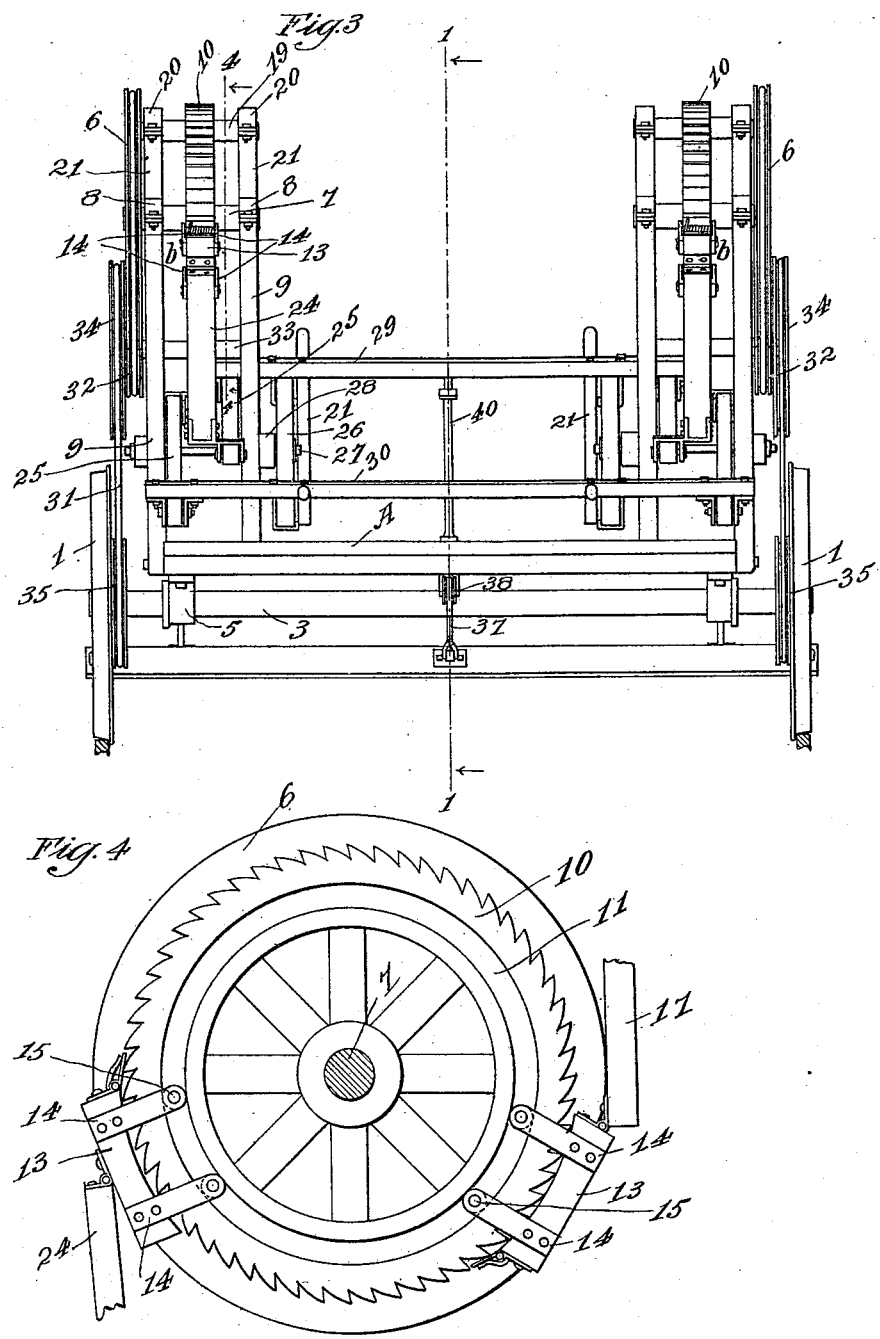

UNITED STATES PATENT OFFICE.

HERMANN FLACHSBART, OF CAPE GIRARDEAU, MISSOURI.

WAGON OR CAR.

SPECIFICATION forming part of Letters Patent No. 538,248, dated April 30, 1895.

Application filed March 14, 1894. Serial No. 503,659. (No model.)

*To all whom it may concern:*

Be it known that I, HERMANN FLACHSBART, a citizen of the United States, residing at Cape Girardeau, in the county of Cape Girardeau and State of Missouri, have invented certain new and useful Improvements in Wagons or Cars; and I do hereby declare the following to be a full, clear, and exact description of the invention, such as will enable others skilled in the art to which it appertains to make and use the same.

This invention relates to a novel construction in wagons or cars, and more particularly to that class of wagons or cars adapted to be propelled by the occupants.

The object of my invention is to provide a wagon or car of this description which may be propelled with ease and at a high speed.

In the accompanying drawings illustrating my invention, Figure 1 is a longitudinal section on the line 1—1 of Figs. 2 and 3. Fig. 2 is a plan of the same. Fig. 3 is a rear elevation of the same, and Fig. 4 is a detail view of the power wheel.

For convenience I have illustrated my invention as applied to a car.

Referring now to said drawings A, indicates the platform of a car constructed in accordance with my invention, which is supported upon wheels 1 and 2 secured to the axles 3 and 4 running in bearings 5 secured to said platform A. The mechanism to propel said car I will describe as follows:

Supported upon uprights 9 on opposite sides of said car are drive wheels 6 mounted upon shafts 7 running in bearings 8 on said uprights 9, of which there are two on each side of said car. Mounted upon said shafts 7 between said uprights 9 on each side of said machine are ratchet wheels 10 by which said shafts 7 and drive wheels 6 are driven. The said ratchet wheels 10 are driven by pawls 12 secured to the operating levers. The said pawls 12 are held in engagement with said ratchet wheels by means of side grooves 11 in said ratchet wheels which engage anti-friction rollers 15 secured at the ends of plates or projections 14 secured to the block 13. I employ two sets of said pawls which for convenience I have indicated by the letters *a* and *b*. The said pawls *a* are pivotally secured to connecting rods 17 which are pivoted at their other ends to levers 18, mounted upon rock shafts 19 pivoted in bearings 20 on the ends of uprights 7. There are two of said uprights 7 on each side of said car and said levers 18 are mounted upon said rock-shafts 19 between each two posts on opposite sides of the car. The said levers 18 are mounted upon said rock-shafts 19 at a point near the forward ends of said levers, and are pivotally secured at their forward ends to connecting rods 22 which connect said levers 18 with the rods 25$^a$. The said rods 25$^a$ are mounted between their ends upon rock shafts 27 and at their other ends are secured to the cross-bar 30 of the treadle frame 23. The said pawls *b* are pivotally secured to connecting rods 24 which connect said pawls with rods 25 which are mounted between their ends on said rock-shafts 27 and at their other ends are secured to the cross-bar 29 of said treadle frame 23. The said treadle frame consists of bars 26 mounted midway between their ends upon rock-shafts 27, said bars 26 being connected by cross-bars 29 and 30 and provided with curved handle bars 21 secured near their ends to said bars 26 and project beyond the ends of the latter. The said rock-shafts 27 are pivoted in bearings in beams 28 extending between and secured to said uprights 9 and 21, said beam 28 being further supported upon uprights 5 and 6. Said drive wheel 6 is geared to a pulley 32 securely mounted upon a shaft 33 pivoted in bearings in the uprights 21. Mounted upon said shaft 33 adjacent said pulley 32 is a pulley 34 preferably of greater diameter than said pulley 32, which is geared to a pulley 35 securely mounted upon the axle 3, whereby said car is driven. Obviously said gearing could be regulated to produce various speeds.

Pivotally secured to the bottom of said car is a brake 36 adapted to be drawn into engagement with the wheels 1 by a cable 37 running over a pulley 38 secured by a hanger to the bottom of the car, and secured at its other end to a reel 39 at the lower end of a rod 40 adapted to be turned by a crank arm 41 secured at the upper end of said rod 40.

The operation of my device is as follows: By rocking the treadle frame on its pivot the rods 25 and 25$^a$ are set in vibration and the motion transmitted to the pawls *a* and *b* in an obvious manner, so that as the pawls *a* engage the ratchet wheels the pawls *b* will return to their normal position and vice versa. The drive wheel 6 is thus kept constantly in rotation and the motion transmitted to the wheels by means of the belts and pulleys hereinbefore referred to.

I claim as my invention—

In a vehicle, a treadle frame, drive-wheels, gearing between said drive-wheels and the wheels of the vehicle, connection between said treadle frame and drive-wheels for rotating the same, consisting of ratchet wheels securely mounted upon the drive-wheel shafts, pawls to engage said ratchet wheels, mechanism to keep said pawls in engagement with said ratchet wheels consisting of anti-friction rollers mounted upon pivots at the ends of projections 14 on said pawls and adapted to engage grooves 11 in the sides of said ratchet wheels, connecting rods to connect said pawls with vibrating levers and with said treadle frame whereby said pawls are brought alternately into engagement with said ratchet wheel for rotating same, substantially as described.

In testimony whereof I affix my signature in presence of two witnesses.

HERMANN FLACHSBART.

Witnesses:
W. G. POLACK,
CHAS. RUESELER.